Aug. 25, 1959     R. P. GAUTHIER ET AL     2,900,858
PORTABLE BEVELING MACHINE
Filed Jan. 5, 1956     2 Sheets-Sheet 1
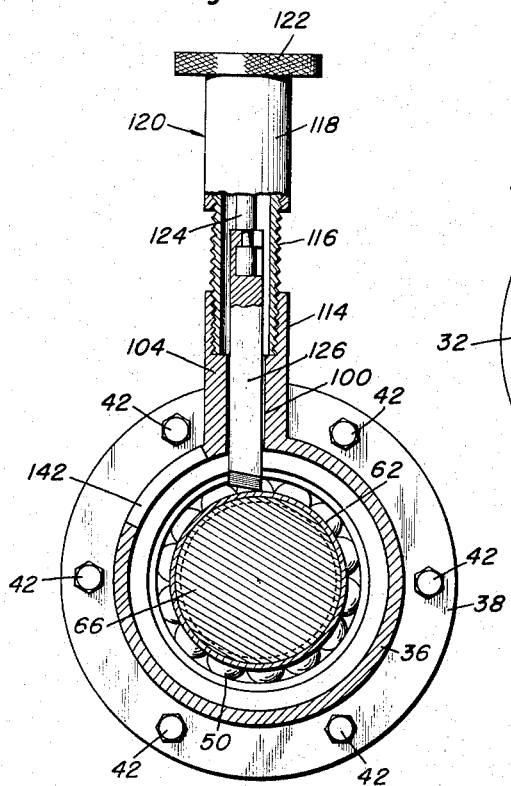
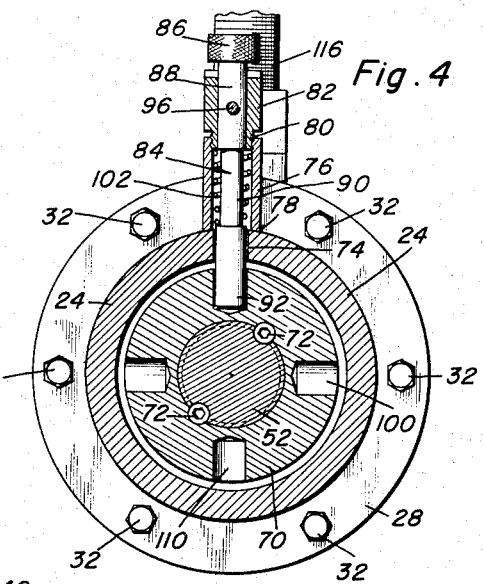
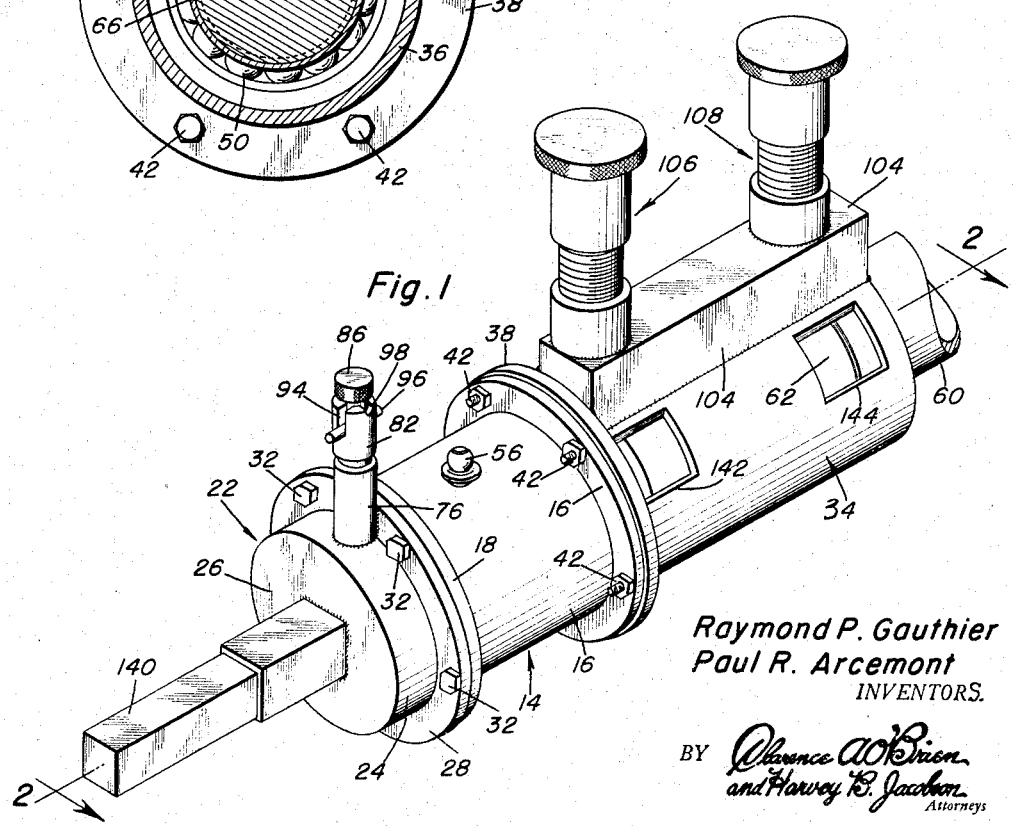
Raymond P. Gauthier
Paul R. Arcemont
INVENTORS.

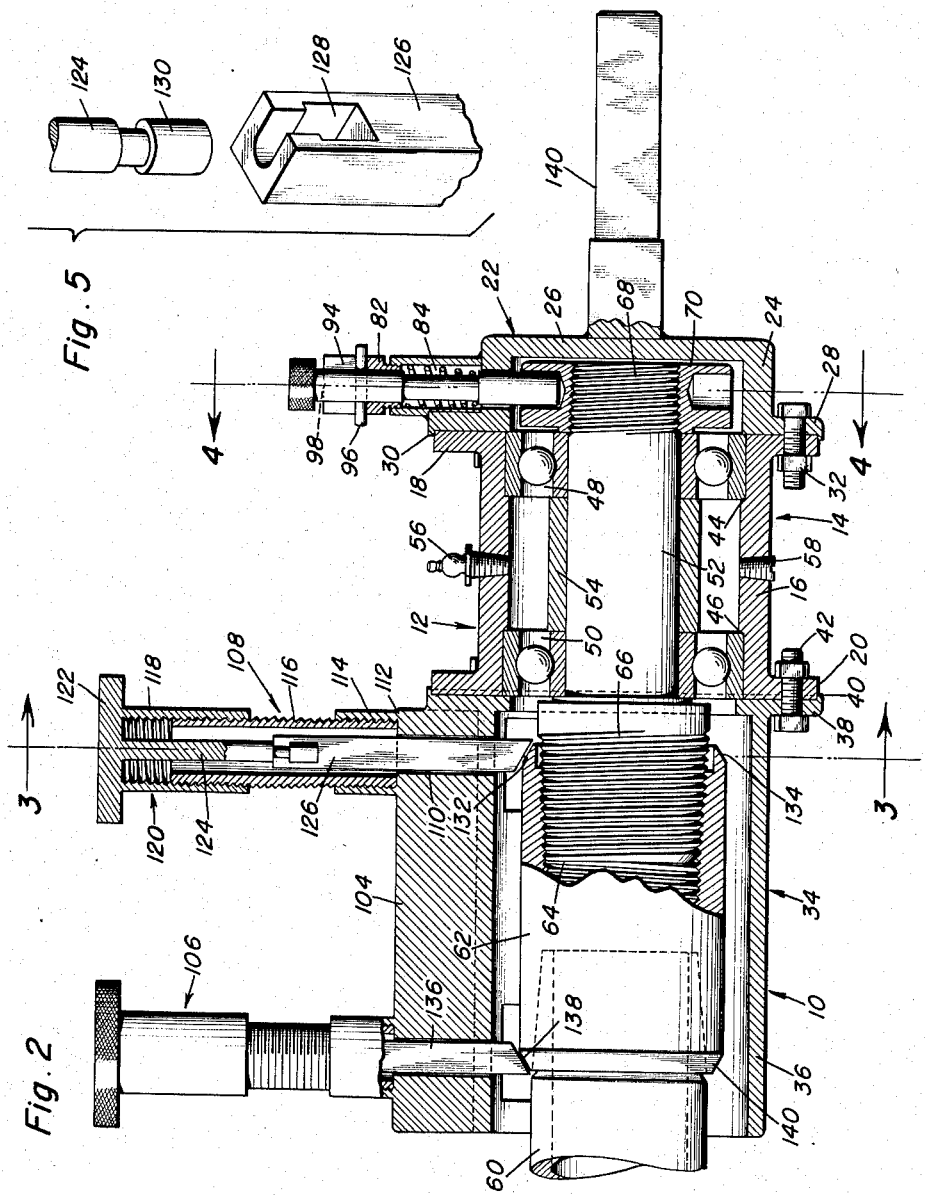

United States Patent Office 2,900,858
Patented Aug. 25, 1959

2,900,858

PORTABLE BEVELING MACHINE

Raymond P. Gauthier and Paul R. Arcemont, Franklin, La.

Application January 5, 1956, Serial No. 557,503

1 Claim. (Cl. 82—4)

This invention relates in general to new and useful improvements in machine tools, and more specifically to an improved machine tool for bevelling couplings of oil well tubing.

In oil well fields, at certain times it is necessary that the couplings of the tubing be bevelled. This is particularly true in the case of a dual oil well completion. At the present time it has been necessary that the tubing to be used in the completion be taken to a machine shop where it is machined so as to bevel the opposite ends of the couplings thereof. This is not only time consuming, but costly in that it necessitates the unnecessary hauling of the tubing to the machine shop and back to the oil drilling rig.

It is therefore the primary object of this invention to provide a portable bevelling machine which is so constructed whereby it may be mounted on sections of tubing for bevelling the opposite ends of couplings thereof in the field.

Another object of this invention is to provide an improved bevelling machine, the bevelling machine being of such nature whereby it may be mounted upon a length of tubing whose couplings are to be bevelled and supported by such tubing, the bevelling machine being completely portable.

Another object of this invention is to provide an improved bevelling machine of a portable type, the bevelling machine being so constructed whereby it may bevel couplings of oil well tubing in the field and may be driven either manually or through some suitable type of portable drive.

A further object of this invention is to provide an improved bevelling machine for use in oil well fields, the bevelling machine being specifically designed for bevelling simultaneously opposite ends of tubing couplings, the machine being of such nature whereby it is highly portable and may be operated by one man.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a perspective view of the bevelling machine which is the subject of this invention and shows the same mounted on a length of tubing for bevelling the coupling thereof;

Figure 2 is an enlarged fragmentary vertical sectional view taken substantially upon the plane indicated by section line 2—2 of Figure 1 and shows the bevelling machine in operation on a tubing coupling;

Figure 3 is an enlarged vertical sectional view taken substantially upon the plane indicated by the section line 3—3 of Figure 2 and shows the specific relationship between one of the bevelling tools and the coupling being bevelled;

Figure 4 is an enlarged fragmentary vertical sectional view taken substantially upon the plane indicated by the section line 4—4 of Figure 2 and shows the manner in which the housing of the bevelling machine may be locked with respect to the supporting shaft thereof to facilitate the coupling and uncoupling of the tubing coupling with respect to the supporting shaft of the bevelling machine; and Figure 5 is an enlarged fragmentary exploded perspective view showing the manner in which a feed screw is releasably connected to one of the bevelling tools.

Referring now to the drawings in detail, it will be seen that there is illustrated the portable bevelling machine which is the subject of this invention, the bevelling machine being referred to in general by the reference numeral 10. The bevelling machine 10 includes an elongated housing which is referred to in general by the reference numeral 12.

The housing 12 includes an intermediate section which is referred to in general by the reference numeral 14. The housing 14 is made up of a cylindrical body portion 16, and annular connecting flanges 18 and 20 at opposite ends thereof. One end of the intermediate section 14 is closed by an end section which is referred to in general by the reference numeral 22. The end section 22 includes a cylindrical body portion 24, an end wall 26, and a connecting flange 28. The connecting flange 28 is provided with an end in a recess 30 in which there is positioned the connecting flange 18. The connecting flanges 18 and 28 are connected together by a plurality of circumferentially spaced fasteners 32. By recessing the connecting flange 28 as at 30 and receiving the connecting flange 18 therein, the sections 14 and 22 may be readily aligned.

The housing 12 also includes an end section which is referred to in general by the reference numeral 34. The end section 34 includes a generally tubular body portion 36 which has one end open and the opposite end provided with a connecting flange 38. The connecting flange 38 is recessed as at 40 and has received therein the connecting flange 20. The connecting flanges 20 and 38 are connected together by a plurality of circumferentially spaced fasteners 42. By recessing the connecting flange, the sections 34 and 14 may be readily aligned.

The body portion 16 is provided with interior recesses 44 and 46 at opposite ends thereof. Seated in the recesses 44 and 46 are bearings 48 and 50, respectively. Rotatably journaled in the bearings 48 and 50 is a supporting shaft 52, the supporting shaft 52 forming a support for the housing 12 and the housing 12 rotating about the supporting shaft 52 when in use.

The supporting shaft 52 is provided intermediate its ends with a spacer 54 disposed between the bearings 48 and 50. If desired, the bearings 48 and 50 may be of the sealed type to retain a lubricant within the housing section 14. The lubricator is inserted into the housing section 14 by means of a suitable lubricant or grease fitting 56. The lubricant is drained from the housing section 14 by means of a suitable drain plug 58.

The purpose of the bevelling machine 10 is to bevel opposite ends of couplings of oil well tubing. A sample length of oil well tubing is referred to by the reference numeral 60 and is provided on one end with a coupling 62. The coupling 62 is provided with internal threads 64 for receiving opposite ends of adjacent sections of the tubing 60 being coupled by the coupling 62. In order that the bevelling machine 10 may be mounted on the tubing section 60, there is secured to one end of the supporting shaft 52 an externally threaded adapter fiting 66. The adapter fitting 66 is threadedly engaged in the end of the coupling 62 remote from the tubing section 60. Thus by coupling the supporting shaft 52 to the tubing section 60, the bevelling machine 10 is mounted on the tubing section 60 for rotation, there being provided in the oil field suitable supports for the tubing section 60, such supports not being illustrated inasmuch as they play no further part in this invention.

The end of the supporting shaft 52 remote from the fitting 66 is externally threaded as at 68. Threadedly engaged with the thread 68 is a collar 70. The collar 70 is locked to the supporting shaft 52 by means of suitable setscrews 72, as is best illustrated in Figure 4.

The body portion 24 is provided with a radial bore 74 whose axis is aligned with a short length of tubing 76 suitably secured to the exterior surface of the body portion 24 and extending radially therefrom, the tubing 76 being preferably secured to the body portion 24 by welding 78.

Suitably engaged in the upper end of the tubing 76 is a reduced lower end 80 of a sleeve 82. Extending downwardly through the sleeve 82 is a locking pin which is referred to in general by the reference numeral 84. The locking pin 84 is provided at its upper end with an enlarged grip portion 86 and an upper intermediate portion 88 which is journaled in the sleeve 82 for both sliding and rotary movement. The locking pin 84 also includes a lower intermediate portion 90 which is of a reduced cross section and a lower portion 92 which is of the same cross section as the upper intermediate portion 88. The lower portion 92 is guidingly received in the bore 74.

As is best illustrated in Figure 2, the sleeve 82 is provided in the upper part thereof with an upwardly open transverse slot 94. Selectively received in the slot 94 is a retaining pin 96 carried by the upper intermediate portion 88 of the locking pin 84. The extreme upper end of the sleeve 82 is provided with a pair of shallow notches 98 disposed transversely of the slot 94 for receiving the pin 96 when the locking pin 84 is in an inoperative position.

Referring now to Figure 4 once again, it will be seen that the collar 70 is provided with a plurality of radially extending, circumferentially spaced bores 100. The bores 100 selectively receive the lower portion 92 of the locking pin 84 to lock the housing 12 to the supporting shaft 52. The locking pin 84 is retained in this last-mentioned position by a coil spring 102 carried by the lower intermediate portion 90 and bearing against the reduced lower end 80 of the sleeve 82. When it is desired to release the housing 12 from the supporting shaft 52, the locking pin 84 is withdrawn from the position illustrated in Figure 4 and supported in a withdrawn position by permitting the pin 96 to seat in the notches 98.

The end section 14 includes a longitudinally extending projecting portion 104 which carries a pair of longitudinally spaced tool assemblies 106 and 108. The tool assemblies 106 and 108 are identical with a minor exception and accordingly the tool assembly 106 will be described in detail.

The projecting portion 104 is provided with a radially extending opening 110 which is square in cross section and which opens into the interior of the end section 34. The opening 110 is aligned with one end of the coupling 62. Aligned with the axis of the opening 110 and secured to the exterior of the projecting portion 104 by welding 112 is an internally threaded sleeve 114. An externally threaded sleeve 116 is threadedly engaged in the internally threaded sleeve 114 and supported thereby. Telescoped over the upper end of the externally threaded sleeve 116 is an internally threaded sleeve 118 of a feed member which is referred to in general by the reference numeral 120. The feed member 120 also includes an enlarged upper grip portion 122 from which there depends a shank 124. The shank 124 is aligned with the axis of the opening 110 and extends below the sleeve portion 118.

Receiving within the externally threaded sleeve 116 and passing downwardly through the opening 110 is a bevelling tool 126. The bevelling tool 126 is provided with a generally T-shaped cross sectional slot 128 in the upper end thereof for receiving a T-shaped cross sectional lower portion 130 of the shank 124. The connection between the shank 124 and the tool 126 is such that the shank 124 may be rotated while the tool 126 remains stationary except for longitudinal movement.

It is to be understood that the lower end of the tool 126 is provided with a suitable work-engaging edge 132. The work engaging edge 132 progressively bites into the collar 62 so as to form a desired bevel 134. As the housing 12 is rotated about the coupling 62, the tool 126 is fed into the coupling 62 by means of the feed assembly 120.

The bevelling tool assembly 106 differs from the bevelling tool assembly 108 only that it is provided with a tool 136 which has a lower cutting edge 138 disposed opposite from the cutting edge 132. Thus, the opposite end of the collar 62 is provided with a bevel 140 which is opposite to the bevel 134.

In order that the bevelling tool 10 may be driven, there is secured to the end wall 26 a driving shank 140. The driving shank 140 is so shaped whereby it may be readily engaged by a ratchet wrench for manual turning. However, it is readily adapted for engagement in a collar of an existing portable drive unit so that the housing 12 may be mechanically driven.

By use of the present invention, the bevelling machine 10 is mounted on a tubing section by first locking the housing 12 to the supporting shaft 32. The entire bevelling machine 10 is rotated by means of the shank 140 so as to thread the adapter fitting 66 into the open end of the coupling 62 so that the relationship between the bevelling machine 10 and the tubing section 60 assumes that illustrated in Figure 2. However, at this time the tools 126 and 136 are withdrawn so as to clear the coupling 62.

It is to be understood that at such time as the bevelling machine 10 is mounted on the tubing section 60, the tubing section 60 is firmly supported in a slightly elevated position and locked against rotation. Once the coupling 62 has been secured to the adapter fitting 66, the locking pin 84 is moved to an inoperative position. Then the housing 12 is rotated either by use of the aforementioned ratchet wrench or the desired power unit. As the housing 12 is rotated at a slow speed, the tools 126 and 136 are slowly fed into the coupling 62 by a manual operation. In order to determine the extent of the bevels 134 and 140, there is provided suitable windows 142 and 144 for viewing the opposite ends of the coupling 62. After the coupling 62 has been bevelled at the opposite ends thereof to the desired extent, this being determined by visual inspection, rotation of the housing 12 is then stopped. Next the tools 126 and 136 are withdrawn to clear the coupling 62. Then the docking pin 84 is again locked with the collar 70 and the housing 12 is rotated in such a direction to unscrew the adapter fitting 66 from the coupling 62. The tubing section 60 and the bevelled coupling 62 are then ready for use in conjunction with an oil well.

From the foregoing description of the present invention, it will be readily apparent that there has been devised an extremely simple tube which may be mounted on tubing sections for the purpose of bevelling the couplings thereof in the field. Further, the bevelling machine 10 is relatively light in weight and may be carried in position by one man. After the bevelling machine 10 has been positioned by the one man, the same man can operate it to provide the desired bevels 134 and 140.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A pipe coupling bevelling machine comprising a supporting shaft, a housing, said housing including an intermediate section and first and second end sections, means rotatably journalling said intermediate section on said supporting shaft, drive means connected to said first end section and extending therefrom remote from said intermediate section for rotating said housing, said shaft including a threaded end portion projecting into and terminating within said second end section for threadedly receiving a pipe coupling to be bevelled while such coupling remains connected to a pipe, a pair of longitudinally spaced tool holders carried by said end sections for rotation therewith and for supporting bevelling tools in oppositely facing directions, the opposite end of said shaft projecting into said first end section, a retaining collar on said opposite end of said shaft retaining said shaft within said intermediate section, and a locking pin carried by said first end section for engaging said collar and retaining said shaft against rotation whereby a pipe coupling may be coupled to and removed from said shaft.

References Cited in the file of this patent
UNITED STATES PATENTS

| | | |
|---|---|---|
| 353,485 | Donnally | Nov. 30, 1886 |
| 481,193 | Richards | Aug. 23, 1892 |
| 680,756 | Bond | Aug. 20, 1901 |
| 1,133,519 | Wilson | Mar. 30, 1915 |
| 2,537,916 | Rosenboom | Jan. 9, 1951 |